(12) United States Patent
Potter et al.

(10) Patent No.: US 7,143,300 B2
(45) Date of Patent: Nov. 28, 2006

(54) AUTOMATED POWER MANAGEMENT SYSTEM FOR A NETWORK OF COMPUTERS

(75) Inventors: Mark R. Potter, Tomball, TX (US);
Thomas L. Buske, Spring, TX (US);
John M. Cagle, Houston, TX (US);
John M. Hemphill, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 894 days.

(21) Appl. No.: 09/915,082

(22) Filed: Jul. 25, 2001

(65) Prior Publication Data

US 2003/0023885 A1    Jan. 30, 2003

(51) Int. Cl.
*G06F 1/26* (2006.01)
*G06F 15/173* (2006.01)

(52) U.S. Cl. .................. 713/323; 713/321; 718/105; 719/224

(58) Field of Classification Search ................ 713/300, 713/310, 320, 322, 323, 324, 321; 718/100, 718/105; 709/223, 224
See application file for complete search history.

(56) References Cited

U.S. PATENT DOCUMENTS

| | | | | |
|---|---|---|---|---|
| 6,408,395 B1* | 6/2002 | Sugahara et al. | ........... | 713/310 |
| 6,601,084 B1* | 7/2003 | Bhaskaran et al. | ......... | 718/105 |
| 6,704,877 B1* | 3/2004 | Cline et al. | ................. | 713/320 |
| 6,711,691 B1* | 3/2004 | Howard et al. | ............. | 713/300 |
| 6,748,222 B1* | 6/2004 | Hashem et al. | ............. | 455/453 |
| 6,859,882 B1* | 2/2005 | Fung | .......................... | 713/300 |

* cited by examiner

*Primary Examiner*—Thuan Du

(57) ABSTRACT

A computer system comprising a plurality of computing entities includes automatic power management logic that automatically transitions the system to a state in which less power is consumed when appropriate. The determination as to when this transition should occur is based on determining when demand for the processing abilities of the system are reduced. Once the decision has been made to transition to a reduced power state, the system's power management logic makes this transition in such a way to preferably minimize or at least reduce the performance impact on the system. Also, rather than altering the power state of one of the computing entities in the system, the entity can be deployed as part of another computing system.

26 Claims, 2 Drawing Sheets

AUTOMATED POWER MANAGEMENT SYSTEM FOR A NETWORK OF COMPUTERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to power management in a system comprising a plurality of computers. More particularly, the present invention relates to changing the power state of one or more computers in the system based on a change in demand for the processing capability of the system or in accordance with criteria specified by a user.

2. Background of the Invention

As is well known, a computer can execute a software application to perform virtually any desired function. As is also known, processing capability can be increased by networking together more than one computer. Each computer in the network then can be assigned one or more tasks to perform. By having a plurality of computers working in concert with each computer performing a portion of the overall set of tasks, the productivity of such a system is much greater than if only one computer was forced to perform the same set of tasks.

Computers, of course, require electrical power to operate and, as a result, generate heat. Despite attempts to reduce the electrical current draw and heat generation by computers, computers today generally draw more electrical power and generate more heat than previous generations of computers. Networks of computers may require very substantial amounts of electrical power and which may cause a great deal of heat to be generated. The electrical power required to power computers is, of course, not free of charge and, at times, may carry a very substantial cost. The heat generated, particularly by networks of computers, may also be very substantial and, if not removed from the system, may damage the computers. There is an additional cost associated with the cost of the electrical power required for the cooling systems necessary to remove the heat from the computers. The amount of power required for cooling is proportional to the amount of heat that must be removed. Thus, all else being equal, any reduction in the electrical current draw by a computer or network of computers is highly desirable.

One relatively recent advancement in the area of power management involves an individual computer being able to monitor its level of activity and transition itself to a reduced power consumption mode of operation during periods of low activity. For example, if no input, such as from a keyboard, mouse, disk drive, or a network connection, has been received for a certain amount of time, the computer may take action to reduce its power consumption. One response to such a low level of activity might be turn off all disk drives within the computer or to clock one or more of the computer's microprocessor at a reduced frequency.

Although helpful in managing power consumption on an individual computer basis, this type of methodology may not be the most efficient technique to manage power in a network of computers. Accordingly, any improvement that can be made in the area of computer power management is highly desirable.

BRIEF SUMMARY OF THE INVENTION

The problems noted above are solved in large part by a computer system comprising a plurality of computing entities and includes automatic power management logic that automatically transitions the system to a state which uses an amount of power commensurate with the processing demands for the system. For example, if the processing demands are reduced, the power management logic transitions the system to a state in which less power is consumed. The determination as to when this transition should occur is based on determining when demand for the processing abilities of the system is reduced. Once the decision has been made to transition to a reduced power state, the system's power management logic makes this transition in such a way to preferably minimize or at least reduce the performance impact on the system.

In accordance with a preferred embodiment of the invention, the system comprises a plurality of computers with each computer capable of being in one of a plurality of power states. The system also includes a load balancer and power management logic (which may be embodied in the same or separate pieces of equipment) that couples to the computers and to a network. The load balancer and power management logic provides incoming transaction requests to one of the computers to provide efficient system behavior. The load balancer and power management logic also changes the power state of at least one of the plurality of computers based on transactions on the network. To that end, the load balancer and power management logic may compare the rate of network transactions to a threshold and when the rate falls below the threshold, one or more of the computers will be caused to consume less power. This may happen by the load balancer and power management logic causing a computer to transition to a state in which it consumes less power. Examples of such states include a reduced functionality mode in which a disk drive is turned off or a processor is operated at slower clock frequency. Another lower power state may be the off state in which the computer is essentially off but retains enough active logic to be remotely turned back on when needed.

In another embodiment, groups of computers can be centrally controlled, in part, by the load balancer and power management logic. Rather than altering the power state of one of the computers in the system, the computer can be deployed as part of another group of computers.

These and other advantages will become apparent upon reviewing the following description in relation to the accompanying drawings.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . .". Also, the term "couple" or "couples" is intended to mean either a direct or indirect electrical connection. Thus, if a first device couples to a second device, that connection may be through a direct electrical connection, or through an indirect electrical connection via other devices and connections. The following disclosure refers to power "states." The term "state" is intended to be synonymous with "mode." Further, a computer that is turned off is still considered to be in a power state or mode (i.e., the "off" power state). The term "transaction processing computer" (TPC) refers to a computer or other type of computing entity that performs one or more tasks. A TPC, for example, may respond to a request for a web page, perform a numerical calculation, or any other action. To the extent that any term is not specially defined in this specification, the intent is that the term is to be given its plain and ordinary meaning.

DETAILED DESCRIPTION OF THE PREFERRED EMBODIMENTS

Figure 1:
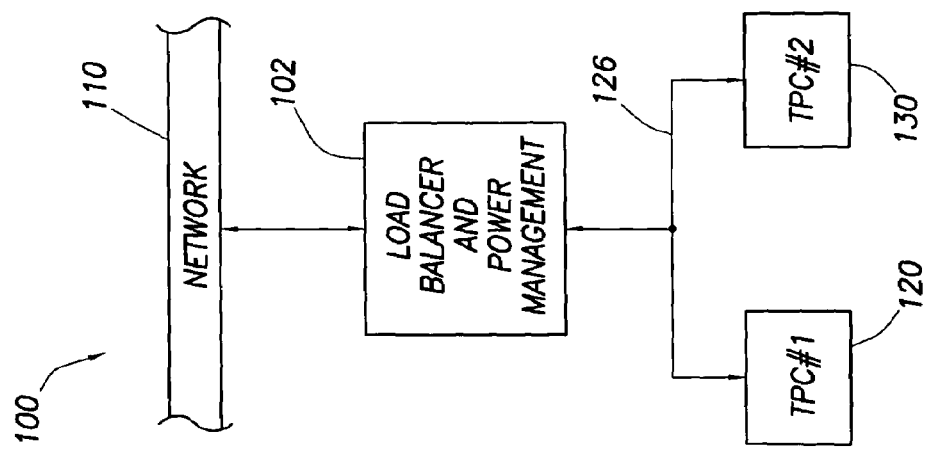
FIG. 1 shows a block diagram of a preferred embodiment of a system of computers which includes load balancing and power management logic to manage power loads in the system.

Referring now to FIG. 1, computer system 100, constructed in accordance with a preferred embodiment of the invention, comprises a load balancer and power management unit 102 coupled to two transaction processing computers (TPCs) 120 and 130. One or more than two TPCs can be included as desired. The load balancer and power management unit 102 may itself be implemented in the form of software, hardware or both on a computer or may be logic implemented in one or both of the TPCs 120, 130. Load balancer and power management unit 102 couples to a network 110 and also couples to TPCs 120, 130 preferably via a separate network 126. Network 110 may be represent any suitable type of network available to system 100 for receiving transactions for processing such as the Internet or any local or wide area networks. Each of the TPCs 120, 130 preferably are implemented as computers (e.g., servers) that execute off-the-shelf or custom software.

Computer system 100 can be set up to perform any desired function. For example, the system could be a "data center" such as for hosting a web site. Further, the TPCs comprising the computer system 100 could be located in the same general area or they could be located in different sites.

In general, the load balancer and power management unit 102 receives requests from agents (not shown) on network 110 for system 100 to perform certain tasks. The load balancer and power management unit 102 examines each incoming request and decides which of the TPCs 120, 130 should perform the requested activity. The load balancer and power management unit 102 may make this decision in accordance with any of a variety of well-known or custom specified criteria that permit the computer system 100 to function efficiently. Preferably, the decision as to which TPC should perform an action requested from network 110 is a function of which TPC is able to more quickly respond to requests in general as well as which TPC has fewer requests pending to be executed. As such, TPCs 120, 130 generally are capable of performing the same tasks (i.e., they have the same or similar software applications). Although one TPC is capable of performing most or all of the incoming requests, the system 100 functions more efficiently if both TPCs 120, 130 are used to perform actions at the same time.

In accordance with the preferred embodiment shown in FIG. 1, each TPC 120, 130 can be placed in one of at least two power states—a higher power state and a lower power state. In the higher power state, a TPC consumes more power than in the lower power state. For example, the higher power state may be a "normal" operational mode in which the TPC operates at its full capability. The lower power state may be a reduced power mode in which the TPC operates at a reduced functionality that requires less power than in the normal mode. This reduced power state may involve reducing the frequency of a clock signal that is provided to the TPC's processor (not specifically shown in FIG. 1). It is well known that a processor consumes less power when clocked at a slower rate. Alternatively or additionally, the reduced power state may involve turning off ("spinning down") one or more disk drives (not shown), such as hard drives, in the TPC or even turning power off to the TPC altogether. In general, the reduced power state involves reducing the functionality of the TPC in order to save power. Thus, any mode of operation (including the off state) that results in lower power usage is intended to be within the scope of the reduced power state.

More than two power states can be provided if desired. For example, the power states may include a normal state, a reduced power state (lower processor clock frequency or disk drives turned off) and an off state (including standard "hibernation" or "sleep" states). The load balancer and power management unit 102 may issue commands or messages or otherwise cause a TPC to transition from one power state to another preferably to efficiently manage the power usage of the system 100 as explained below.

Referring still to FIG. 1, load balancer and power management unit 102 is capable of causing each TPC 120, 130 to transition to any of the power states that are implemented in each TPC. To cause a TPC to transition to a particular power state, the load balancer and power management unit 102 preferably sends a message over network 126 to the desired TPC. The message contains the address, or other TPC identifying information, and the new desired power state. The TPC then transitions to the power state specified by the load balancer and power management unit 102 and, if desired, can be programmed to report a successful power state transition to the load balancer and power management unit.

The load balancer and power management unit 102 preferably decides when to transition either, or both, TPC 120, 130 to a different power state based generally on the needs of the system 100 to effectively perform the tasks it receives from network 110. In general, the load balancer and power management unit 102 causes one or more TPCs to change power states so as to draw less power when the processing demands on the system 100 become less. Thus, system 100 is able to automatically scale back to save power when its current processing capacity is not needed. Then, if processing demands increase, the system 100 preferably changes the power state of its TPCs to cause the TPCs to be in a more productive mode of operation (e.g., normal state).

It should be recognized that the load balancer and power management unit 102 may perform, or cause to be performed, various actions before changing the power state of a TPC. For example, when turning off a TPC, the load balancer and power management unit may first cease sending transactions to the targeted TPC and wait for the TPC to complete all of its pending transactions before turning it off.

There are many ways to implement the above power management methodology and, unless otherwise stated, the claims which follow should not be limited to any particular technique. One suitable technique is for the load balancer and power management unit 102 to monitor a parameter associated with system 100 that is representative of the demand for the processing abilities of the system. One suitable parameter is the rate of transactions to and/or from the load balancer and power management unit 102 over the network 110. The load balancer and power management unit 102 preferably monitors the transaction rate to and/or from the network 110 and load balancer and power management unit 102. The load balancer and power management unit 102 compares this transaction rate parameter to a specified range of values, which may be a threshold value. The threshold may be represented in terms of a number of bytes per second of network traffic, transactions per second or any other suitable metric. The threshold could also be set based on maximum power allowed by the plurality of computers. Broadly, the threshold may be set in any way desired. For example, the threshold may be preset, programmed or dynamically determined and adjustable during normal system operation. Other control techniques such as neural networks, expert systems, rule based systems, adaptive learning, Bayesian predictive methods, and other techniques as are known in the artificial intelligence field could be applied to control the decision making process for this system.

In accordance with the preferred embodiment of the invention, the load balancer and power management unit 102 may also determine or otherwise examine the efficiency or speed at which each TPC 120, 130 has shown to perform the transactions provided to it by the load balancer and power management unit. This value may be expressed, for example, in terms of the average amount of time a TPC takes to perform its transactions. This value may demonstrate that historically one of the TPCs 120, 130 may be able to respond more quickly than the other TPC. Numerous other TPC-specific performance criteria can be examined in addition to, or instead of, response time.

By examining these two criteria—system-wide demand and TPC performance—the load balancer and power management unit 102 can determine when and how to alter the power state of the TPCs. More specifically, the load balancer and power management unit 102 monitors the network traffic on network 110 to determine when the transaction rate falls below the threshold. The threshold is preferably at a level such that network traffic below the threshold does not need system 100 to be at its full capability to provide satisfactory performance. One of ordinary skill in the art will recognize that the threshold level depends on the system, the types of transactions it performance and a variety of other facts and, thus, will be different from system to system. In this situation, however, at least one of the TPCs can be transitioned to a lower power state of operation.

When the load balancer and power management unit 102 determines that network traffic is less than the threshold, the load balancer and power management unit determines which of the TPCs 120 or 130 to transition to a reduced power mode of operation. This determination preferably is made based on an examination of the second criteria—individual TPC performance. Accordingly, the load balancer and power management unit 102 preferably transitions the least efficient or the slowest TPC to the lower power state. The idea is that the system 100 should attempt to keep the more efficient TPCs running at full capability and reduce the power consumption by those TPCs that function less efficiently anyway. Of course, so as not to be limiting, the load balancer and power management unit 102 could decide to transition a more efficient TPC to a reduced power state.

To summarize at this point, the computer system 100 provides automatic power management logic that automatically transitions the system to a state in which less power is consumed. The determination as to when this transition should occur is based on determining when demand for the processing abilities of the system are reduced. Any suitable parameter, value or piece of information useful to make this determination is within the scope of this disclosure. Then, once the decision has been made to transition to reduced power state, the system's power management logic makes this transition in such a way to preferably minimize or at least reduce the performance impact on the system.

Figure 2:
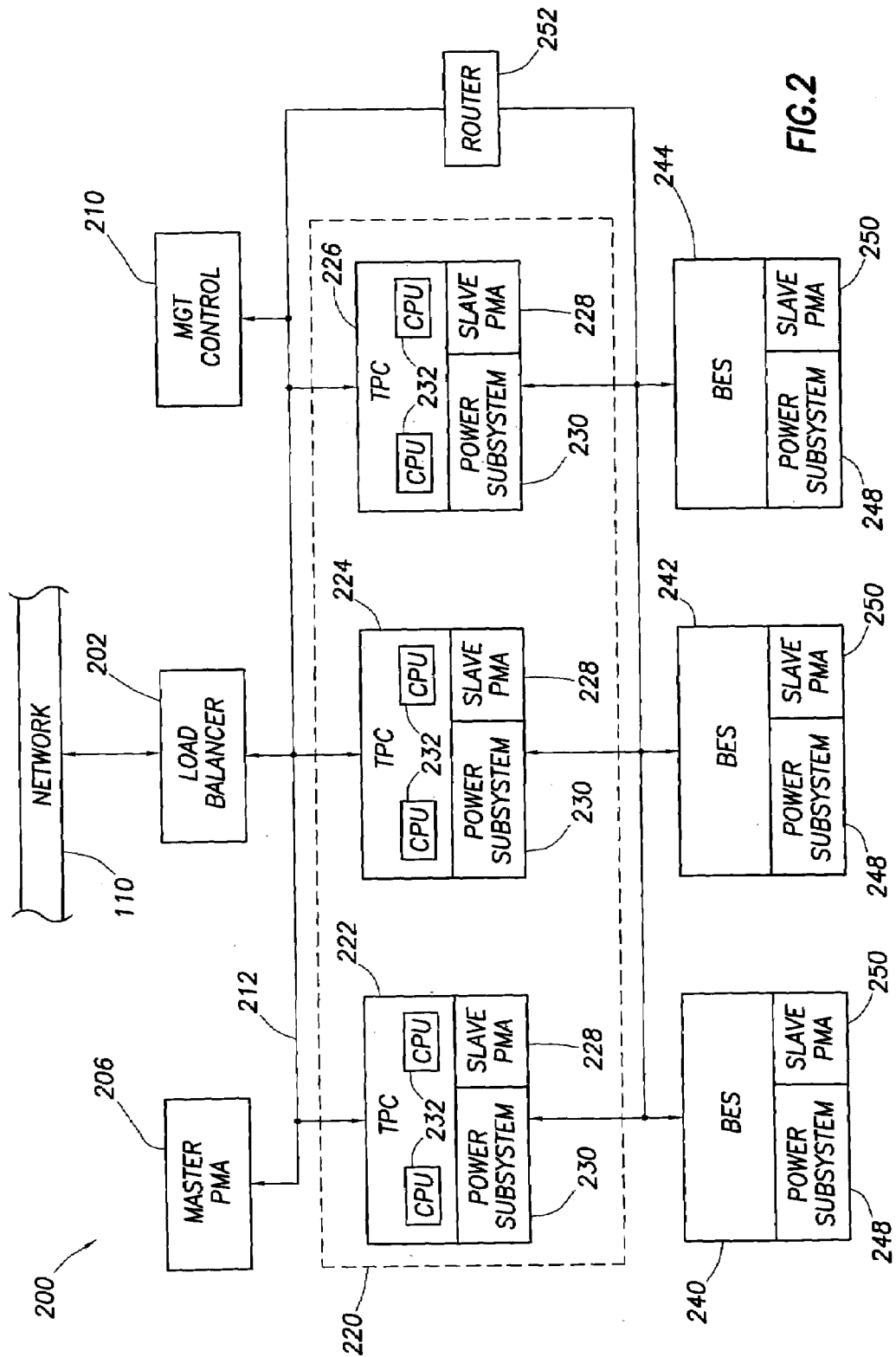
FIG. 2 shows an alternative embodiment of the system of FIG. 1.

Another preferred embodiment of the invention is shown in FIG. 2. As shown, computer system 200 includes a load balancer 202, master power management agent (PMA) 206, management control unit 210, and a collection of TPCs 222, 224, 226 which form a "rotation group" 220. In this embodiment, the master PMA 206 and load balancer 202 are shown as separate entities coupled together via network 212. As noted above, however, master PMA 206 and load balancer 202 need not be separate components but, alternatively, can be integrated together. In accordance with the preferred embodiment, master PMA 206 and load balancer 202 are implemented as separate computers executing software that provides the functionality described herein.

As shown, the load balancer 202 receives transactions from network 110 and identifies the TPC in the rotation group 220 to deliver each transaction for further processing. Any suitable implementation of load balancer 202 is acceptable such as the BIG-IP load balancer by F5 Networks.

Each TPC 222, 224, 226, which preferably comprises a server computer executing application software, includes a slave PMA 228 and a power subsystem 230. The power subsystem 230 includes a power supply for converting AC voltage to suitable DC voltage levels in accordance with known techniques. The power subsystem 230 preferably also includes logic that monitors the power usage levels of the TPC. For example, such logic might keep track of the instantaneous and/or average power usage (e.g., measure in watts or kilowatts) and provide those values to an external device upon request. As such, the master PMA 206 can request the power usage values from each TPC to determine the overall power usage by the rotation group 220.

The slave PMA 228 in each TPC preferably responds to commands from the master PMA 206 over network 212. Upon command, the slave PMA 228 can transition the TPC from one power state to another. In accordance with a preferred embodiment of the invention, the TPC power states may include:

Fully active
Reduced power
Hibernate or sleep (Wake-On-Lan or could be awakened via another method)
Off/Wake-On-LAN (or could be awakened via another suitable method)

The fully active state means that the TPC is fully operational which also means it is capable of drawing more power than in any other state. The reduced power state means that one or more features of the TPC has been disabled or has had its performance reduced. Examples of this state include, without limitation, turning off one or more hard disk drives, turning off one or more of the CPUs 232 (if the TPC has more than one CPU), slowing down the clock frequency to one or more of the CPUs, and the like. The Off/Wake-On-LAN state means the TPC effectively is completely shut down, but retains enough active logic to be able to be turned back on by a remote command from network 212. It is well within the knowledge level of a person of ordinary skill in the art how to remotely wake up a computer over a LAN (which stands for "Local Area Network").

Once the master PMA 206 determines that a TPC should be transitioned to a different power state, the master PMA 206 informs the load balancer 202 of this decision so that the load balancer can will not attempt to perform an action inconsistent with the TPC's new power state. If the new power state is the off state, for example, the load balancer 202 will cease sending transactions to the TPC which is to be turned off. Once that TPC has ceased receiving transactions and is in an "idle" state (i.e., not processing a transaction), the master PMA 206 can then command that TPC'c slave PMA 228 to the off state. The master PMA 206 may determine the appropriate time to turn off the TPC in accordance with any suitable technique. Examples of such techniques include the master PMA waiting a predetermined sufficient period of time to permit the TPC to become idle, the master PMA receiving a message from the load balancer 202 that the TPC is idle, or the master PMA polling the TPC until the TPC reports it has completed processing all pending transactions or equivalent message.

Referring still to FIG. 2, master PMA 206 monitors one or more aspects or parameters associated with system 200 and, when appropriate, changes the power state of one or more of the TPCs in the rotation group. To this end, the master PMA 206 receives various "system values" from load balancer 202 over network 212. These system values may include a transaction rate and TPC-specific performance values. The transaction rate may include the number of bytes per second of incoming transactions from the network 110 to the load balancer, the number of outgoing bytes per second or both. The TPC-specific performance values may include a value which indicates how quickly a particular TPC is able to respond to the transactions it receives from the load balancer 202. The load balancer 202 can monitor and keep track of how fast each TPC 222, 224, and 226 responds to its request by measuring, for example, the time between sending a transaction to a TPC and the time that the TPC completes the task and returns data or other information to the load balancer 202. The monitored time can be a running average response time, a minimum and/or maximum response time or any other desired metric for determining the responsiveness of a TPC. Alternatively, each TPC itself can measure or otherwise determine how quickly it responds to requests from the load balancer 202. Thus, the master PMA 206 either can receive TPC-specific metrics from the load balancer 202 or from the TPCs themselves.

A management control unit 210 permits a person (e.g., a network administrator) to manage the power load of system 200. Using the management control unit 210, an administrator can specify power consumption criteria which the master PMA 206 strives to achieve. There are many ways in which the criteria can be specified. For example, and without limitation, the administrator can command the master PMA 206 to operate according to one of the following protocols, namely:

Fixed Time Sequence.

Fixed Time Sequence Plus Rule Based.

Fixed Time Sequence Plus Rule Based Plus Adaptive Learning.

Maximum Power/Heat.

Performance.

The fixed time sequence criteria may include specifying the power state for each TPC during predetermined or programmable periods of time. For example, from 8 AM until 5 PM, two of the TPCs may be set to their normal (full power) power states while the remaining TPCs are shut off or placed in another type of reduced power state. Then, from 5 PM until 8 AM when network traffic is historically lightest, perhaps only one TPC is kept fully operational with the remaining TPCs placed in a reduced or off state. Additional and/or different time periods of course can be specified. It is determined ahead of time specifically which TPCs are to be at which power states during these time periods.

Alternatively, the fixed time sequence criterion may be implemented by simply specifying the number of TPCs to be at the various power states during various periods of time without identifying which specific TPC is to be at a given power states. Instead, the master PMA, once it knows how many TPCs are to be at each power state, can determine which specific TPCs are to placed in each power state. For instance, if the master PMA knows that two TPCs must be turned off, then it may analyze the turn-around time metrics for the TPCs to identify the TPCs that historically have taken the longest time to perform their tasks and turn off the two slowest TPCs. It should be appreciated that many other embodiments of fixed time sequencing can be implemented and all such embodiments are embraced within the scope of this disclosure.

The Fixed Time Sequence Plus Rule Based criterion refers to a combination of a fixed time sequence, such as that described above, with a set of behavior rules. By way of example, during one period of time, a rotation group 220 may comprise eight fully operational TPCs. During this period of time, a rule is implemented such that if a certain condition becomes true, the power state of at least one TPC is changed. An exemplary rule might be if the number of incoming transactions to the load balancer 202 from the network 110 becomes less than N per second, then the power state for a certain number of TPCs in the rotation group is altered (e.g., reduced power state or off state). The number of effected TPCs may be calculated as one TPC for each N/M transactions per second less than N, where M is the number of TPCs in the rotation group.

The third protocol listed above (Fixed Time Sequence Plus Role Based Plus Adaptive Learning) combines the first two protocols with adaptive learning. Adaptive learning logic, embodied in master PMA 206, learns from temporal performance patterns and attempts to provide proactive behavior such as adding additional members to the rotation group prior to such additional members being needed.

The maximum power/heat protocol involves a network administrator specifying a maximum (peak or average) power load on the system 200 with the master PMA 206 optimizing the performance of the system given the specified power load. The master PMA 206 accomplishes this protocol by knowing the power draw each TPC incurs as well as the performance characteristics of each TPC (e.g., average number of transactions per second the TPC is capable of processing). Alternatively, heat sensors can be included in or around any or all of the TPCs, master PMA and load balancer and a maximum (peak or average) temperature threshold can be set above which the master PMA transitions TPCs to lower power states to reduce the heat dissipated by the system. Temperature sensors may be included on the outside of a cabinet containing the equipment to monitor ambient temperature. The threshold may be set as a temperature difference between the equipment of system 200 and the ambient air temperature. These types of TPC performance information may be maintained in the master PMA 206 and/or the load balancer and may be based on manufacturer's specifications or empirical data based on actual use in the system.

Using the performance protocol, the administrator can specify an acceptable performance level for the system and the master PMA 206 attempts to provide that performance level at the lowest power level possible.

Referring still to FIG. 2, one or more back end servers (BES) 240, 242, 244 coupled to the TPCs 222, 224 and 226 as shown may also be included as part of computer system 200. Such back end servers can be used for specific purposes such as maintaining a database. A router 252 can be incorporated into the system architecture as well to coordinate the efficient routing of transactions and switching functions in accordance with known techniques. As shown in FIG. 2, like the TPCs in the rotation group 220, each back end server 240, 242 and 244 preferably also includes at least one CPU 246, a slave PMA 250 and a power subsystem 248. As described above, the master PMA 206 can command each back end server to a desired power state.

In addition to the master PMA 206 commanding each TPC 222, 224, 226 and back end server 240, 242, 244 to a desired power state, each TPC and back end server may transition itself (without the assistance of the master TPC) to a different power state in accordance with know techniques. For example, if a TPC or back end server detects that it has been inactive for a predetermined or programmable amount of time, the TPC or back end server's power management subsystem 230, 244 may cause a transition to a lower power consumption state (e.g., reduced power or off). Further, before, during or after such a transition, the device whose power state is altered may inform the load balancer 202 or the master PMA 206 which then informs the load balancer of its new power state. Not only does the load balancer use this information when deciding how to route future transactions, but the master PMA 206 also uses this information to control the power consumption of the entities in the system 200.

Figure 3:
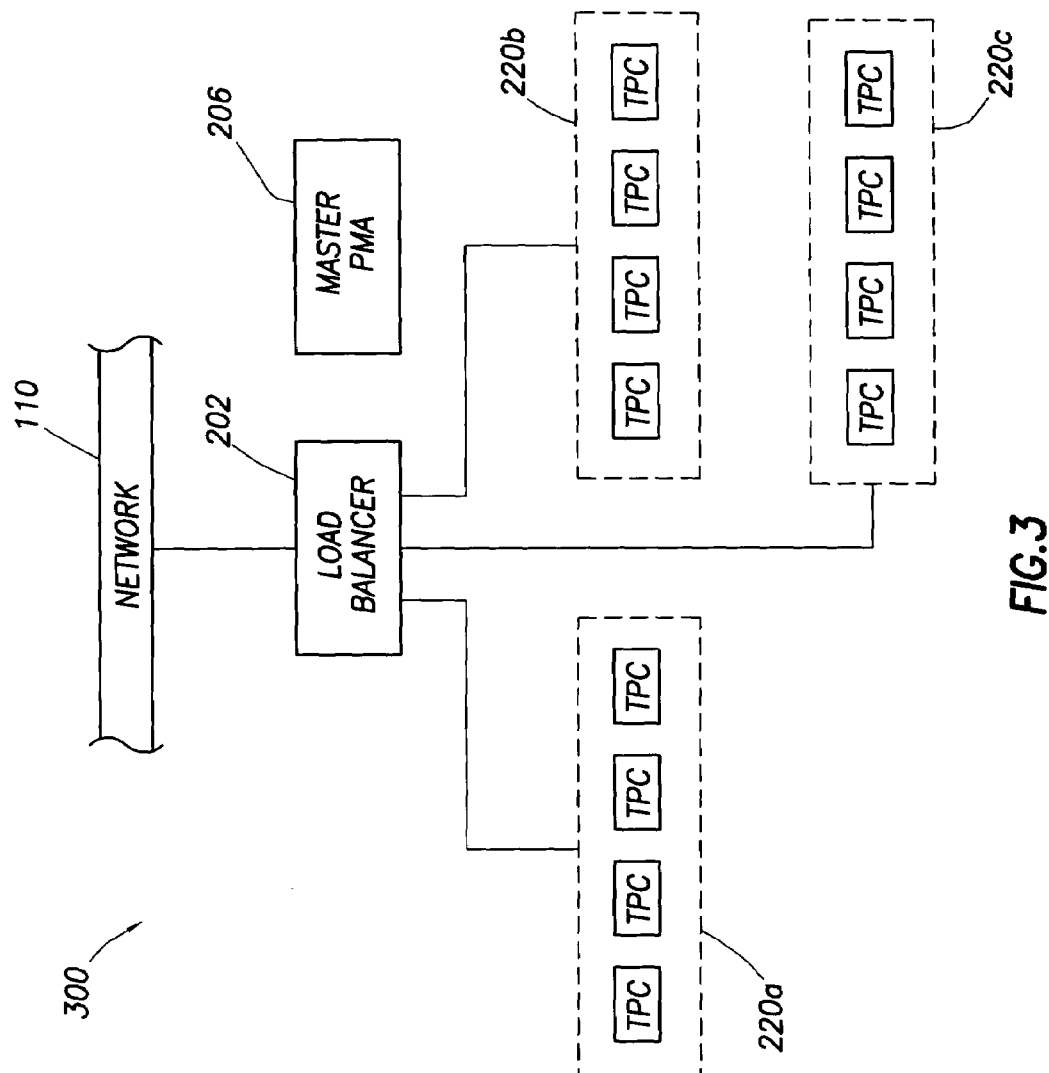
FIG. 3 shows another alternative embodiment of the system of FIG. 1.

FIG. 3 illustrates another advantage of the preferred embodiment of the invention. As shown, the TPCs can be grouped into multiple rotation groups designated as 220*a*, 220*b*, and 220*c*. Any number of TPCs can be provided in each rotation group 220. Each rotation group generally performs a distinct function from the other rotation groups. For example, each rotation group may implement a web site and system 300 generally functions to host the various web sites which are run by the various rotation groups 220.

As described above, the master PMA 206 determines that one or more TPCs in a rotation group can be placed into a state that uses less or no power. Alternatively, however, rather than the master PMA 206 changing the power state of a TPC, the master PMA can cause the TPC to be deployed to another rotation group, particularly a rotation group that needs increased processing capacity. As such, the power management scheme described above can be adapted to provide "dynamic provisioning" by which TPCs can be used in other rotation groups when not needed in their current rotation group.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
   a plurality of groups of computers, each computer capable of being in one of a plurality of power states, said groups of computers comprising at least a first group of computers and a second group of computers wherein the first group of computers performs a different function than the second group of computers; and
   a load balancer and power management logic coupled to said groups of computers and to a network external to said computer system, wherein said load balancer and power management logic identifies a computer that is operating less efficiently than another computer in said first group of computers and, based on said transactions from said network, deploys the identified computer for use in the second group of computers instead of said first group of computers;
   wherein each group performs transactions received from said external network.

2. The computer system of claim 1 wherein said network comprises the Internet.

3. The computer system of claim 1 wherein said load balancer and power management logic determines when an amount of transactions on said network drops below a threshold and when this occurs deploys said identified computer for use in the second group of computers.

4. The computer system of claim 1 wherein said load balancer and power management logic identifies the computer that is operating less efficiently by considering how fast each of said computers responds to transactions.

5. A computer system, comprising:
   a load balancer computer having a connection to a network and receiving transactions from said network;
   a master power management agent (PMA) coupled to said load balancer;
   a plurality of transaction processing computers coupled to said load balancer computer and said master power management agent and receiving said transactions from said load balancer computer for processing, said transaction processing computers configured into at least a first group of transaction processing computers and a second group of transaction processing computers and wherein the first group of transaction processing computers performs a different function than the second group of transaction processing computers;
   wherein said master PMA causes the transaction processing computer within said first group of transaction processing computers that is determined to operate slower than another computer within said first group of transaction processing computers to be deployed for use in said second group of transaction processing computers when the master PMA determines that a rate of transactions received by the load balancer from the network falls below a threshold; and
   wherein each of said first and second groups performs transactions received from said network.

6. The computer system of claim 5 wherein said master PMA selects a transaction processing computer to be deployed for use in the second group of transaction processing computers based on how fast the transaction processing computer responds to transactions from said load balancer.

7. The computer system of claim 6 wherein each of said transaction processing computers reports how fast the transaction processing computer responds to said transactions to said master PMA.

8. The computer system of claim 6 wherein said load balancer monitors how fast each of said transaction processing computers respond to transactions.

9. A data center, comprising:
- a master power management agent (PMA) coupled to a first network;
- a plurality of transaction processing computers coupled to said first network;
- a load balancer computer having a connection to a second network over which the load balancer computer receives transactions and said load balancer is coupled to said first network over which said transactions are delivered to the transaction processing computers for further processing;
- a management control console coupled to said first network and permitting a user to specify an upper limit for power usage by said data center and said master PMA maximizes a performance of the data center for a specified power limit by changing an operational state of a transaction processing computer that is determined to operate slower than at least one other transaction processing computer based on a level of transactions received by the load balancer from the second network.

10. The data center of claim 9 wherein each transaction processing computer includes power control logic which provides power usage information to said master PMA.

11. The data center of claim 9 wherein each transaction processing computer includes power control logic which can transition each transaction processing computer from one power state to another.

12. The data center of claim 9 wherein said master PMA transitions said transaction processing computers between power states, said power states selected from the group consisting of fully operational, reduced power and off.

13. A data center, comprising:
- a master power management agent (PMA) coupled to a first network;
- a plurality of transaction processing computers coupled to first network;
- wherein a user via a management control console can specify a performance criterion for said data center and said master PMA reduces an overall power usage of the data center for a specified performance criterion by causing a transaction processing computer, determined to be operating less efficiently than another transaction processing computer, to transition to a lower power consumption state.

14. The data center of claim 13 further including a load balancer computer having a connection to a second network over which the load balancer computer receives transactions and coupled to said first network over which said transactions are delivered to the transaction processing computers for further processing.

15. The data center of claim 13 wherein each transaction processing computer includes power control logic which provides power usage information to said master PMA.

16. The data center of claim 13 wherein each transaction processing computer includes power control logic which can transition the transaction processing computer, determined to be operating less efficiently, from one power state to another.

17. A method of managing power in a system comprising a plurality of computers organized into at least a first functional group and a second functional group, the method comprising:
- monitoring a rate of transactions received from a network external to said system;
- determining when said rate falls below a defined value;
- identifying a computer within the first functional group that is operating slower than another computer in said first functional group; and
- if said rate falls below the defined value, deploying the identified computer for use in the second functional group;
- wherein each of said first and second functional groups performs transactions received from said external network.

18. The method of claim 17 wherein identifying the computer comprises identifying the computer that performs transactions slower than all other computers as the computer for changing a power state.

19. A computer system, comprising:
- a plurality of computers coupled together over a network, each computer capable of being in one of a plurality of power states; and
- power management logic coupled to said computers and to said network, wherein said power management logic changes the power state of at least one of said plurality of computers that is determined to operate with less efficiency than another computer based on a protocol, said protocol including time sequences which specify permitted computer system power usage.

20. The computer system of claim 19 wherein said protocol includes a time sequence in which computer system power usage is specified for certain periods of time and said power management logic adjusts the power state of said at least one computer determined to operate with less efficiency to conform with said time sequence.

21. The computer system of claim 20 wherein said power management logic selects a computer to transition to a new power state based on a performance of said computer relative to other of said computers.

22. The computer system of claim 19 wherein said protocol includes a time sequence in which computer system power usage is specified for certain periods of time and a rule which specifies a limit of system behavior.

23. The computer system of claim 19 wherein said protocol includes a time sequence in which computer system power usage is specified for certain periods of time, a rule which specifies a limit of system behavior and adaptive learning based on temporal performance of the computer system.

24. The computer system of claim 19 wherein said protocol includes maintaining the power draw of the system below a threshold while maximizing performance.

25. The computer system of claim 19 wherein said protocol includes maintaining the heat dissipation of the system below a threshold.

26. The computer system of claim 19 wherein said protocol includes maintaining the heat dissipation of the system below a threshold while maximizing performance.

* * * * *